(12) United States Patent
Otsuka (10) Patent No.: US 7,676,238 B2
(45) Date of Patent: Mar. 9, 2010

(54) MOBILE RADIO EQUIPMENT AND METHOD OF CONTROLLING TRANSMISSION RATE FOR MOBILE RADIO EQUIPMENT

(75) Inventor: Osamu Otsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 1280 days.

(21) Appl. No.: 10/698,391

(22) Filed: Nov. 3, 2003

(65) Prior Publication Data

US 2004/0102177 A1 May 27, 2004

(30) Foreign Application Priority Data

Nov. 7, 2002 (JP) ............................ 2002-324081

(51) Int. Cl.
  *H04B 7/00* (2006.01)
  *H04Q 7/20* (2006.01)
(52) U.S. Cl. .................. 455/522; 455/13.4; 455/69; 455/73
(58) Field of Classification Search .............. 455/67.11, 455/423, 403, 405, 407, 425, 522, 69, 70, 455/73, 91, 95, 127.1, 13.4
  See application file for complete search history.

(56) References Cited

U.S. PATENT DOCUMENTS

| | | | | |
|---|---|---|---|---|
| 5,223,816 | A * | 6/1993 | Levinson et al. | 340/539.13 |
| 5,327,461 | A * | 7/1994 | Kushige | 375/244 |
| 5,541,955 | A | 7/1996 | Jacobsmeyer | |
| 5,978,414 | A * | 11/1999 | Nara | 375/225 |
| 6,233,226 | B1 | 5/2001 | Gringeri et al. | 370/252 |
| 6,678,530 | B1 * | 1/2004 | Hunzinger | 455/522 |
| 2001/0000221 | A1 * | 4/2001 | Chen et al. | 375/340 |
| 2002/0178274 | A1 * | 11/2002 | Kovacevic | 709/231 |
| 2003/0063583 | A1 * | 4/2003 | Padovani et al. | 370/329 |
| 2005/0021830 | A1 * | 1/2005 | Urzaiz et al. | 709/234 |

FOREIGN PATENT DOCUMENTS

CN      1263681 A     8/2000

(Continued)

OTHER PUBLICATIONS

European Search Report Dated Sep. 5, 2006.

(Continued)

*Primary Examiner*—Tuan A Pham
(74) *Attorney, Agent, or Firm*—McGinn IP Law Group PLLC (57) ABSTRACT

Mobile radio equipment and a transmission rate controlling method thereof for reducing the rate of transmission between the mobile radio equipment and a base station when the transmission rate is beyond the capability of the application function of the mobile radio equipment to thereby use the resources of the radio base station effectively. A radio transmitter/receiver receives data or radio signals via an antenna. A transmission system function CPU converts or customizes the data to a data format acceptable to an application function CPU. Subsequently, the transmission system function CPU inputs the data via a data input/output section into a data input/output section of the application function CPU. A decoder 16 is fed with the data input to the data input/output section. After that, the data is decoded by the decoder, and output from an input/output section according to the format of the decoded data.

6 Claims, 7 Drawing Sheets

FOREIGN PATENT DOCUMENTS

| | | |
|---|---|---|
| EP | 0 969 623 A2 | 1/2000 |
| EP | 1 085 687 A2 | 3/2001 |
| JP | 10-243048 | 9/1998 |
| JP | 2000-92023 | 3/2000 |
| JP | 2002-171572 | 6/2002 |

OTHER PUBLICATIONS

Chinese Office Action dated Mar. 11, 2005, with English translation.

* cited by examiner

MOBILE RADIO EQUIPMENT AND METHOD OF CONTROLLING TRANSMISSION RATE FOR MOBILE RADIO EQUIPMENT

FIELD OF THE INVENTION

The present invention relates to mobile radio equipment and a method of controlling transmission rate for the mobile radio equipment, and more particularly, to mobile radio equipment which comprises CPUs as two independent functional blocks performing a transmission system function for communicating with base stations and an application function, respectively, and a method of controlling transmission rate for the mobile radio equipment.

BACKGROUND OF THE INVENTION

In recent years, mobile radio equipment has been used to communicate not only by voice but also with images as multimedia progresses, and performs additional functions such as high-speed data transmission, Internet access and the like. It is desirable for the implementation of such functions that the mobile radio equipment be comprised of two independent functional blocks for carrying out a transmission system function and an application function, respectively. Accordingly, a lower layer serves the transmission system function for mainly exchanging a communication protocol with base stations, while an upper layer has the application function for providing user interface and executing application software.

In the following, the configuration of conventional mobile radio equipment will be described.

Figure 1:
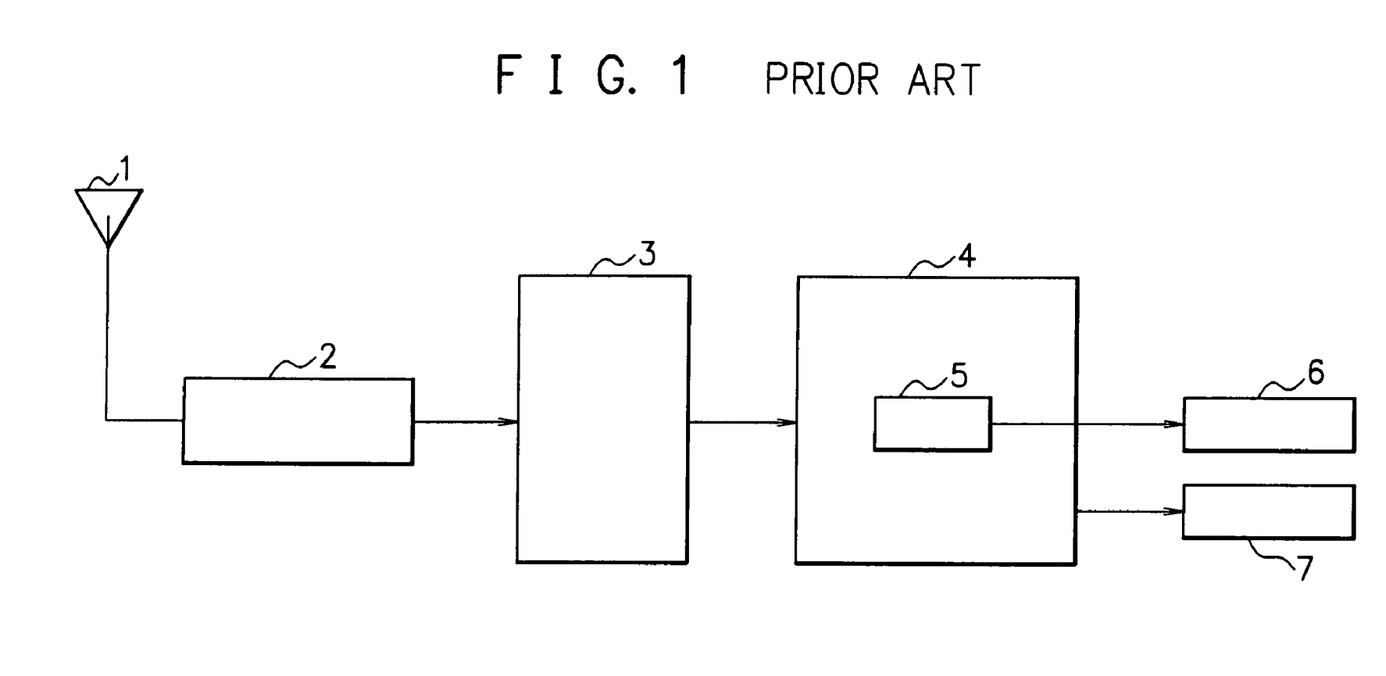
FIG. 1 is a block diagram showing the configuration of conventional mobile radio equipment.

FIG. 1 is a block diagram showing the configuration of conventional mobile radio equipment.

As can be seen in FIG. 1, the mobile radio equipment comprises an antenna 1, a radio transmitter/receiver 2, a transmission system function CPU 3, an application function CPU 4, a decoder 5, an input/output section 6 and a memory 7.

The radio transmitter-receiver 2 transmits/receives data or radio signals via the antenna 1 according to the mobile communication system of the mobile radio equipment. When the mobile radio equipment adopts, for example, W-CDMA (Wideband Code Division Multiple Access), the radio transmitter-receiver includes a separator-coupler, an oscillator, a PLL (Phase Locked Loop), a modulator-demodulator, a spreader- reverse spreader for processing baseband signals, and a rake receiver.

The transmission system function CPU 3 controls the radio transmitter-receiver 2, and converts or customizes the data received by the transmitter-receiver 2 to a data format acceptable to the application function CPU 4.

The application function CPU 4 decodes the data input from the transmission system function CPU 3, and executes application software. In addition, the application function CPU 4 controls the input/output section 6 and the memory 7.

The decoder 5 decodes received data using a decoding system compliant with the mobile communication system of the mobile radio equipment and the format of the received data. There are a variety of encoding/decoding systems for multimedia communication data, such as 3G-324M, H. 263, MPEG-4, and MPEG-2.

The input/output section 6 serves as the external interface of the mobile radio equipment. The input/output section 6 includes, for example, communication units such as a microphone and a speaker, a display unit such as an LCD, and an input unit such as a CCD camera. Additionally, the input/output section 6 may include a data communication interface USB (Universal Serial Bus), IEEE1394, Bluetooth and the like.

The memory 7 stores data handled by the application function CPU 4. Examples of the memory 7 include a ROM, a RAM, an IC card, a memory card, a memory card with copyright protection and a disk storage.

When establishing communication, the mobile radio equipment informs a radio base station of the maximum transmission rate at which it can receive data from the base station. Subsequently, the radio base station adjusts resources to allocate resources to the mobile radio equipment newly connected thereto. After that, the radio base station determines the transmission rate for the mobile radio equipment, and enters into communication with the radio equipment.

There is found an example of the conventional technique in Japanese Patent Application laid open No. 2000-92023. In the radio communication system of the conventional technique, a radio line is operated at a data transfer rate or communication rate which can be selected from predetermined values regardless of whether or not communication has already been established. A radio communication terminal changes the communication rate in response to a request from a radio base station. The radio base station informs a correspondent terminal as to the change of the communication rate.

There is found another example of the conventional technique in Japanese Patent Application laid open No. 2002-171572. The conventional technique aims at preventing a packet loss due to the difference of data transfer rate between a terrestrial network and a radio section in a mobile communication system, and also making most efficient use of the transmission performance of radio channels.

Besides, Japanese Patent Application laid open No. HEI10-243048 discloses a system and method for information transmission enabling effective data transmission based on the processing performance of each information communication terminal. With the system and method for information transmission, it is possible to prevent needless transmission as well as the needless use of a disk on the terminal side, and clear contents can be displayed according to the display performance of each terminal.

However, in the above-described conventional techniques, the resources of the radio base station are limited, and maximum efficiency cannot be achieved. Moreover, although the mobile radio equipment demands the maximum rate of data transmission, it does not have a decoding capability commensurate with the maximum transmission rate even if its radio transmission function is sufficient to receive data normally.

SUMMARY OF THE INVENTION

It is therefore an object of the present invention to provide mobile radio equipment and a method of controlling transmission rate for the mobile radio equipment.

In accordance with the first aspect of the present invention, to achieve the above object, there is provided mobile radio equipment comprising: a radio transmitter/receiver for transmitting/receiving data or radio signals; a transmission unit for converting the received data output from the radio transmitter/receiver; an application unit for executing applications; a decoder for decoding the data output from the transmission unit; a memory for storing the decoded data output from the decoder; an input/output section for inputting/outputting the decoded data output from the decoder; a load data output section for outputting the decoded data output from the decoder as load data; a load data input section for inputting the decoded data output from the decoder as load data; a judge section for judging the load data on a preset threshold value (s); and a transmission controller for controlling transmission rate based on a judgment made by the judge section.

In accordance with the second aspect of the present invention, in the first aspect, the judge section judges whether or not a frame loss has occurred in the decoded data.

In accordance with the third aspect of the present invention, in the first or second aspect, the judge section includes a comparator for comparing the load data with the threshold value in order to judge whether or not the amount of the data is within the capacity of the mobile radio equipment to process.

In accordance with the fourth aspect of the present invention, in the third aspect, the comparator compares the load data input from the decoder with the threshold value(s); the transmission controller requests a base station to reduce the data transmission rate when the load data exceeds the threshold value; and the transmission controller requests the base station to increase the data transmission rate when the load data is below the threshold value.

In accordance with the fifth aspect of the present invention, in the fourth aspect, the judge section is provided with two threshold values, one for judging whether or not the load data is beyond the decoding capability of the decoder and the other for judging whether or not the load data is beneath the decoding capability.

In accordance with the sixth aspect of the present invention, there is provided a transmission rate controlling method of mobile radio equipment for controlling the rate of the transmission of data or radio signals between mobile radio equipment and a base station, comprising: a decoding step for decoding encoded data; a judging step for judging whether or not decoding can be performed in time; and a transmission controlling step for controlling the rate of transmission to/from a base station based on a judgment made at the judging step.

In accordance with the seventh aspect of the present invention, in the sixth aspect, the transmission rate controlling method further comprises an inputting/outputting step for inputting/outputting the decoded data output from a decoder, decoding is performed according to encoded data input in the decoder at the decoding step; and the decoded data is output in a format suitable for the input data at the inputting/outputting step.

In accordance with the eighth aspect of the present invention, in the sixth or seventh aspect, the transmission rate controlling method further comprises a detecting step for detecting whether or not the decoding result is normal after encoded data input in the decoder is decoded at the decoding step.

In accordance with the ninth aspect of the present invention, in one of the sixth to eighth aspects, the transmission rate controlling method further comprises a comparing step for comparing the decoded data input from the decoder as load data with a preset threshold value, and the judging step includes the process of judging whether or not the load data is beyond the decoding capability of the decoder based on the comparison result obtained at the comparing step.

In accordance with the tenth aspect of the present invention, in one of the sixth to eighth aspects, the transmission controlling step includes the process of requesting the base station to reduce the data transmission rate when the load data exceeds the threshold value at the comparing step, and the process of requesting the base station to increase the data transmission rate when the load data is below the threshold value.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Referring now to the drawings, a description of a preferred embodiment of the present invention will be given in detail.

Figure 2:
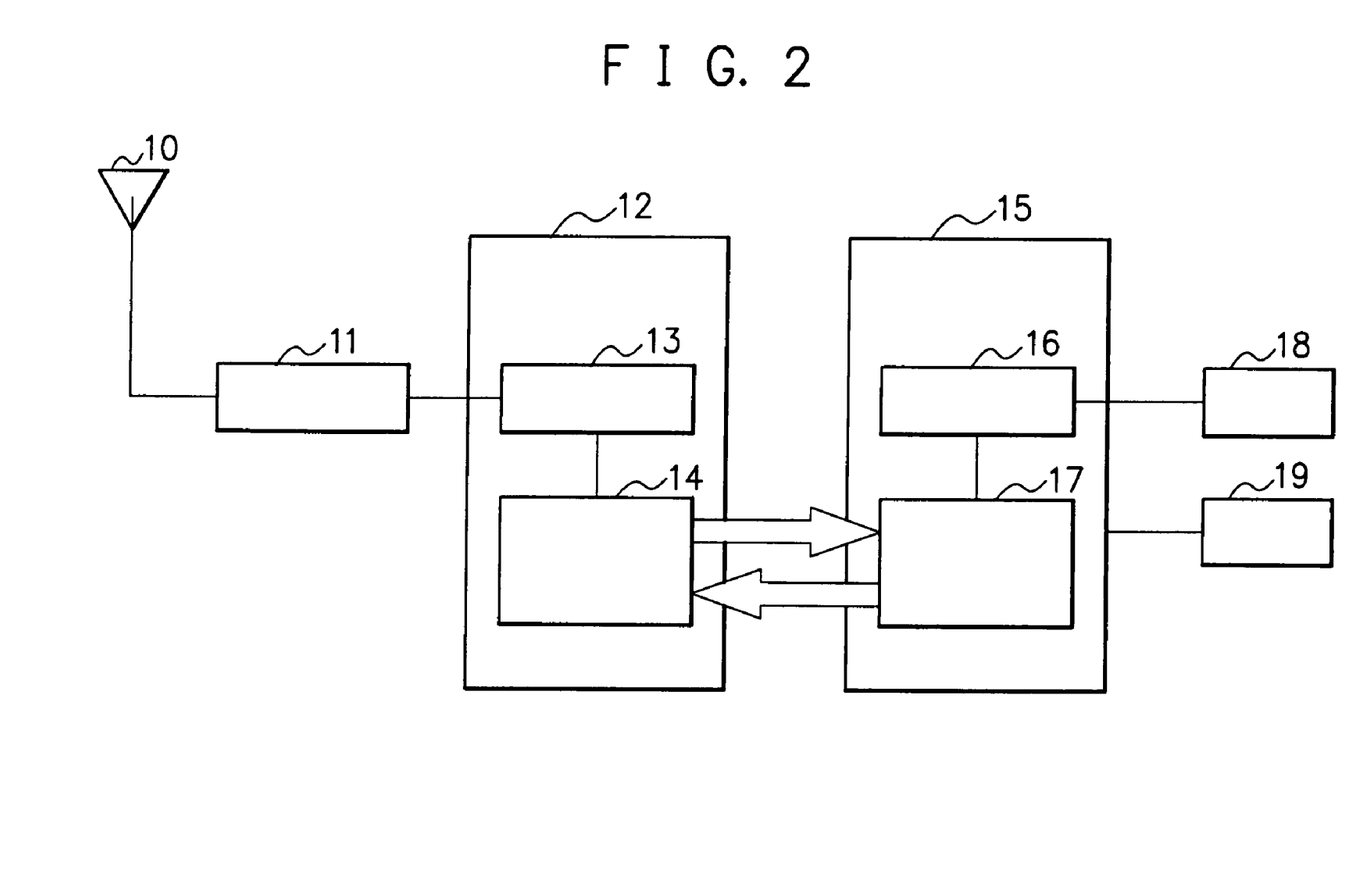
FIG. 2 is a block diagram showing the configuration of mobile radio equipment according to an embodiment of the present invention.

FIG. 2 is a block diagram showing the configuration of mobile radio equipment according to an embodiment of the present invention. Referring to FIG. 2, the mobile radio equipment comprises an antenna 10, a radio transmitter/receiver 11, a transmission system function CPU 12, an application function CPU 15, a decoder 16, an input/output section 18 and a memory 19. The transmission system function CPU 12 includes a transmission controller 13 and a data input/output section 14. The application function CPU 15 includes a decoder 16 and a data input/output section 17. The function of each component will be described later with reference to FIGS. 3 to 8.

Figure 3:
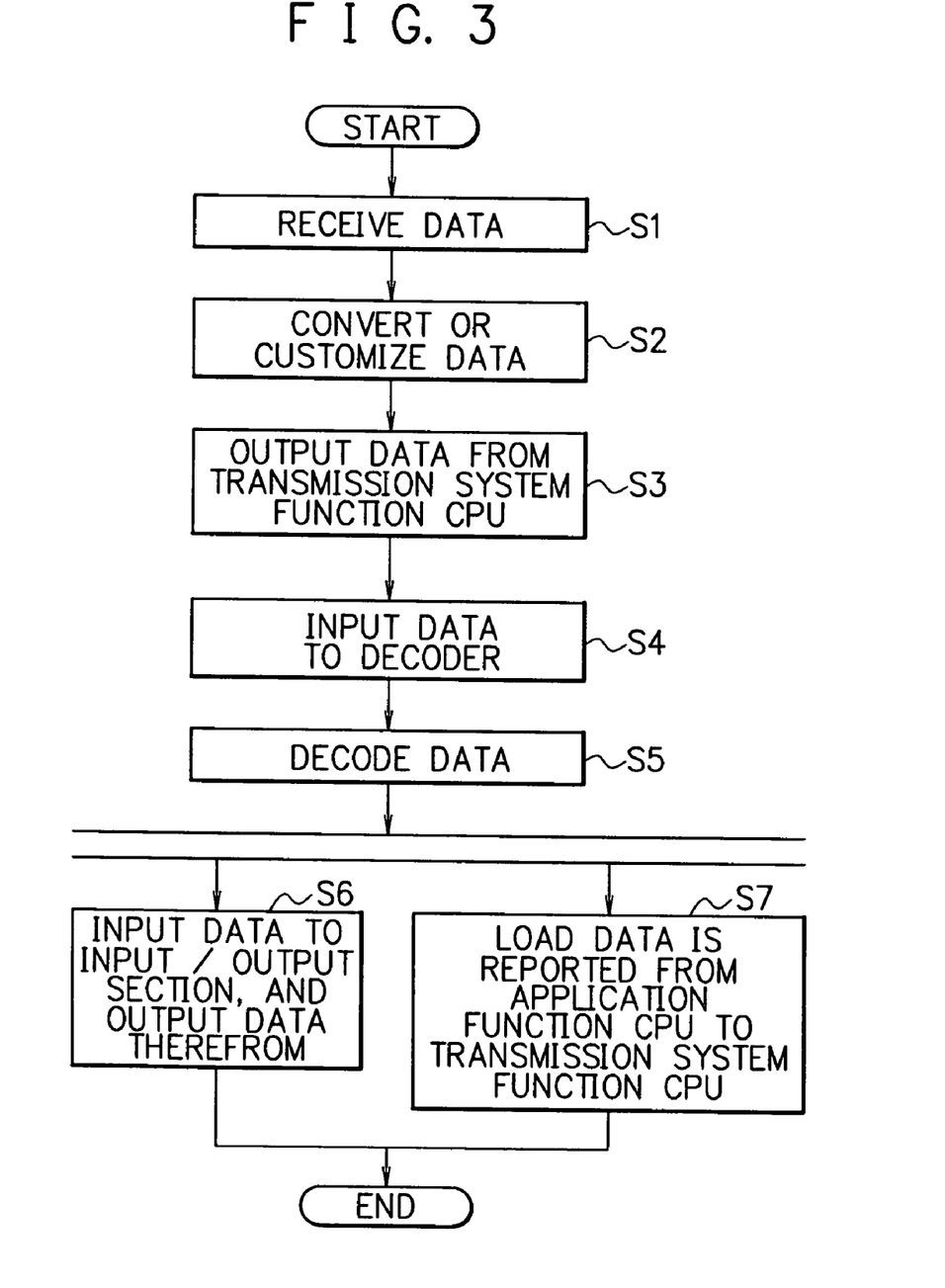
FIG. 3 is a flowchart illustrating the operation of the mobile radio equipment when receiving data.

FIG. 3 is a flowchart illustrating the operation of the mobile radio equipment when its user receives data. Examples of the contents of received data include images and voices.

First, the radio transmitter/receiver 11 receives data or radio signals via the antenna 10 (step S1). The transmission system function CPU 12 converts or customizes the data received by the transmitter-receiver 11 to a data format acceptable to the application function CPU 15 (step S2). The conversion or customization to a data format is made according to an existing communication protocol. Subsequently, the transmission system function CPU 12 outputs the data via the data input/output section 14 to feed it into the data input/output section 17 of the application function CPU 15 (step S3). The decoder 16 is fed with the data input to the data input/output section 17 of the application function CPU 15 (step S4).

After that, the decoder 16 decodes the input data (step S5). On this occasion, decoding is carried out depending on the input data. When the input data is, for example, in the MPEG format, the data is decoded to the RGB format suitable for display. The decoded data is fed into the input/output section 18, and then output therefrom (step S6). If the data is in the RGB format, image is displayed on the display such as an LCD. On the other hand, if it is voice data, voice is output from a speaker or the like. Concurrently with the process of step S6, the decoded data is fed to the transmission controller 13 of the transmission system function CPU 12 from the application function CPU 15 via the data input/output sections 14 and 17 (step S7).

Figure 4:
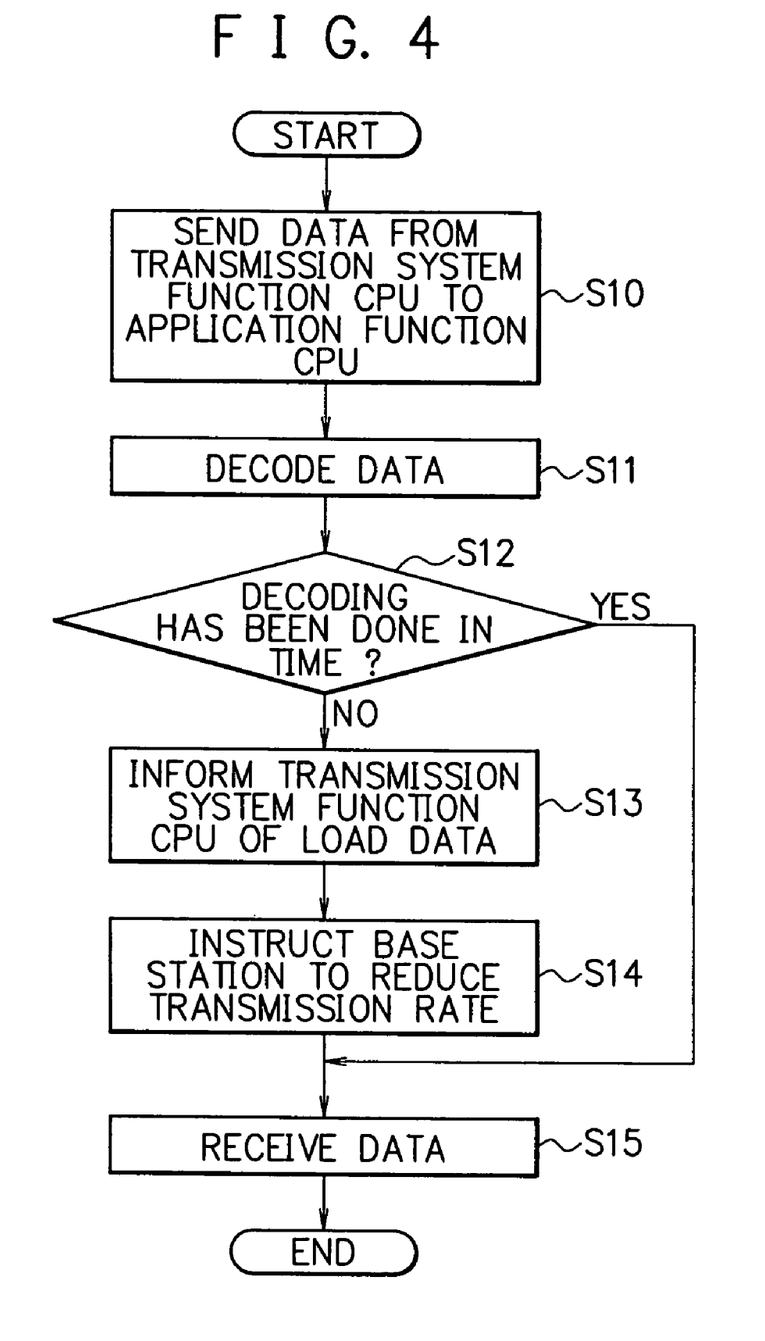
FIG. 4 is a flowchart illustrating the operation of the mobile radio equipment for decoding.

FIG. 4 is a flowchart illustrating the operation of the mobile radio equipment for decoding data. In the following a description will be made of the operation of the mobile radio equipment for decoding data.

First, the transmission system function CPU 12 sends data to the application function CPU 15 (step S10). Subsequently, the application function CPU 15 decodes the data (step S11), and judges whether or not the decoding has been done in time (step S 12). When the decoding has not been done in time or there is a delay in decoding (step S12, NO), the application function CPU 15 informs the transmission controller 13 of the transmission system function CPU 12 about the data as the load data of the application function CPU 15 via the data input/output sections 14 and 17 (step S13).

Next, the transmission system function CPU 12 reduces the transmission rate (step S14). That is, having received data indicating that there is a delay in decoding, the transmission controller 13 outputs data for instructing a base station to reduce the rate of transmission therefrom by radio. After that, the radio transmitter/receiver 11 receives data via the antenna 10 (step S15), and the transmission system function CPU 12 converts the data to a data format acceptable to the application function CPU 15 (operation is repeated from step S1).

Figure 5:
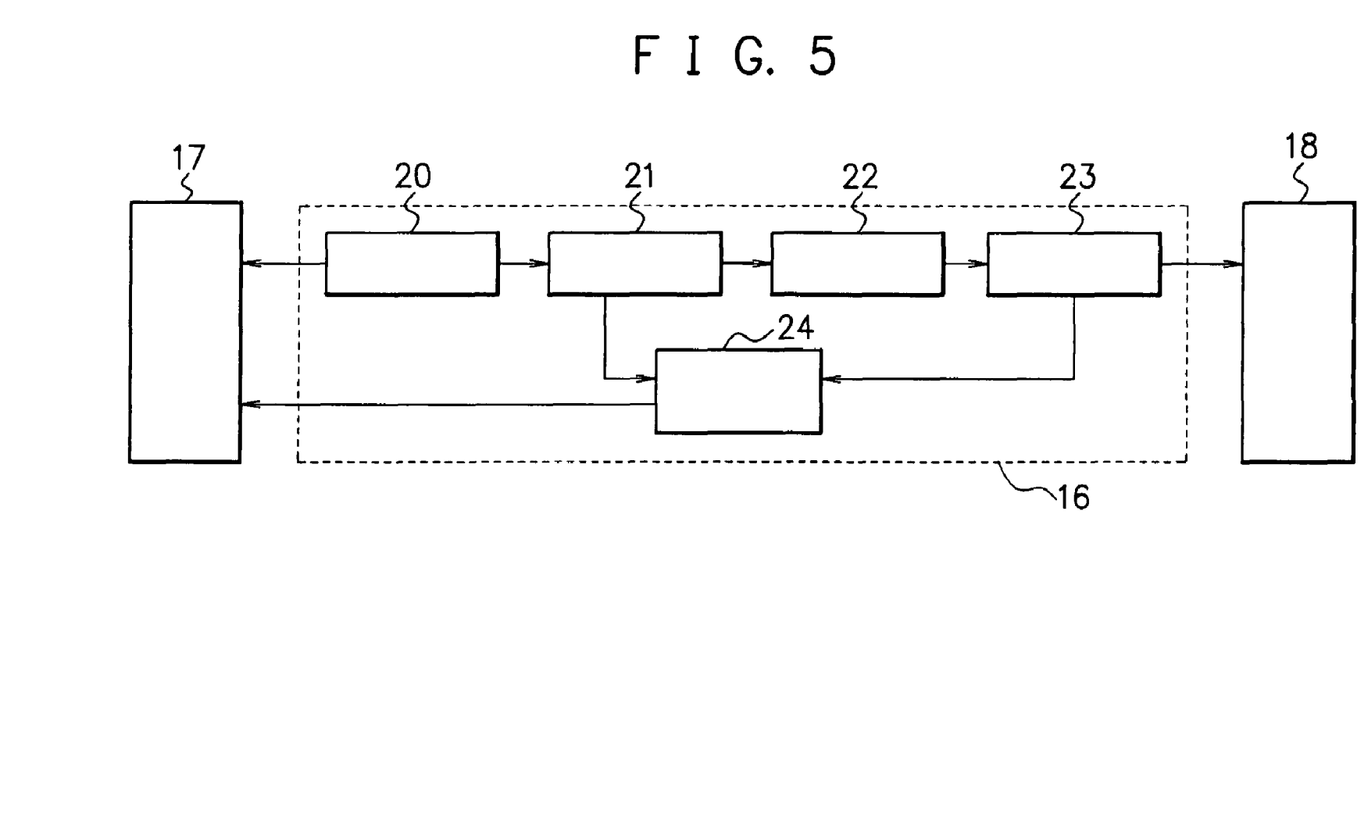
FIG. 5 is a block diagram showing the configuration of a decoder according to an embodiment of the present invention.

FIG. 5 is a block diagram showing the configuration of the decoder 16 according to the embodiment of the present invention.

The decoder 16 of the application function CPU 15 includes a multiple separation section 20, a buffer 21, an image decoder 22, a postprocessor 23, and a monitor-judge section 24.

The multiple separation section 20 separates encoded data into voice data, image data or the like.

The encoded data is read into the buffer 21 before it is actually used, and stored therein. The image decoder 22 decodes the encoded data according to a decoding algorithm.

The postprocessor 23 performs processes, such as format conversion and D/A conversion, to display images, etc. on the display (not shown).

The monitor-judge section 24 is provided with a preset threshold value, and compares the amount of encoded data stored in the buffer 21 and the preset threshold value. The comparison result is output to the data input/output section 17.

Figure 6:
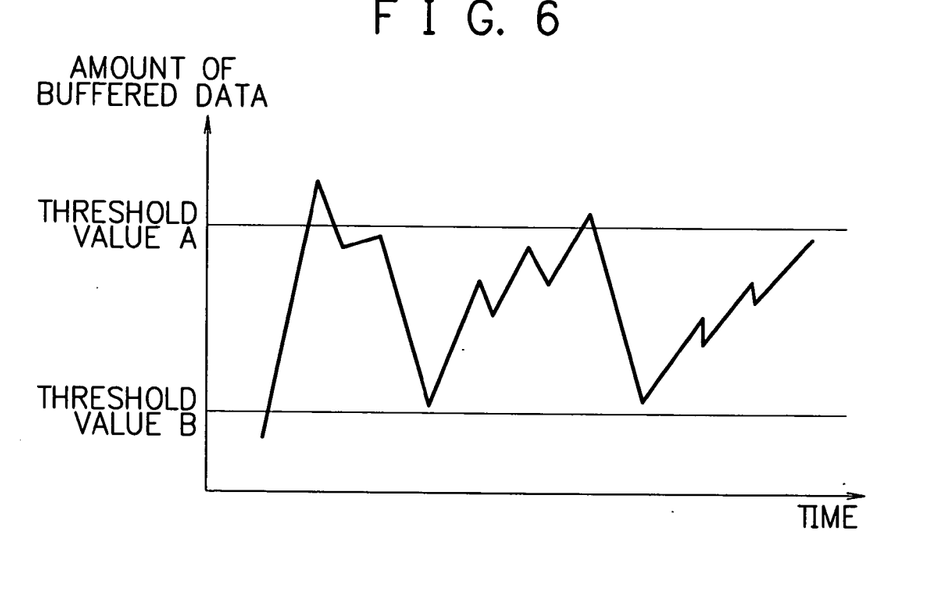
FIG. 6 is a graph showing threshold values set for a monitor-judge section according to an embodiment of the present invention.
Figure 7:
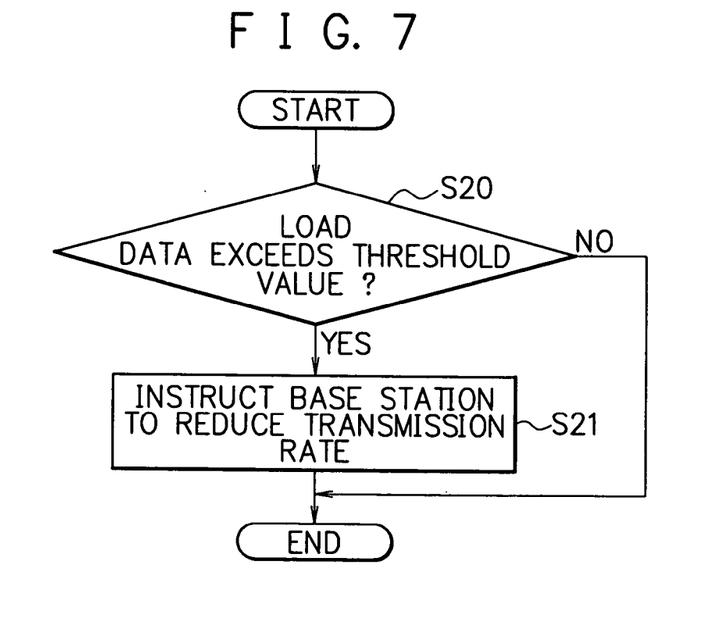
FIG. 7 is a flowchart illustrating the operation of the mobile radio equipment for comparing data with a threshold value.

FIG. 6 is a graph showing threshold values set for the monitor-judge section 24. FIG. 7 is a flowchart illustrating the operation of the mobile radio equipment for comparing the amount of encoded data stored in the buffer 21 with a threshold value. In the following, a description will be made of the operation of the mobile radio equipment for comparing the amount of buffered data with a threshold value.

First, the monitor-judge section 24 of the decoder 16 judges whether or not the load data exceeds the threshold value shown in FIG. 6 (step S20). When the load data exceeds the threshold value (step S20, YES), the decoder 16 informs the transmission controller 13 of the transmission system function CPU 12 about this. The transmission system function CPU 12 instructs a base station to reduce the transmission rate (step S21). On the other hand, when the load data does not exceed the threshold value (step S20, NO), the decoder 16 repeats the process of comparing the load data and the threshold value to determine whether or not the load data exceeds the threshold value (operation is repeated from step S20).

Incidentally, the transmission system function CPU 12 may judge whether or not the load data exceeds the threshold value on behalf of the decoder 16.

In addition, the transmission system function CPU 12 may compare the load data of the decoder 16 and the thresholds A and B shown in FIG. 6 input from the application function CPU 15. In this case, the transmission controller 13 of the transmission system function CPU 12 outputs data for instructing the base station to reduce the rate of transmission therefrom when the load data exceeds the threshold A. On the other hand, when the load data is below the threshold B, the transmission controller 13 outputs data for instructing the base station to increase the rate of transmission therefrom.

Figure 8:
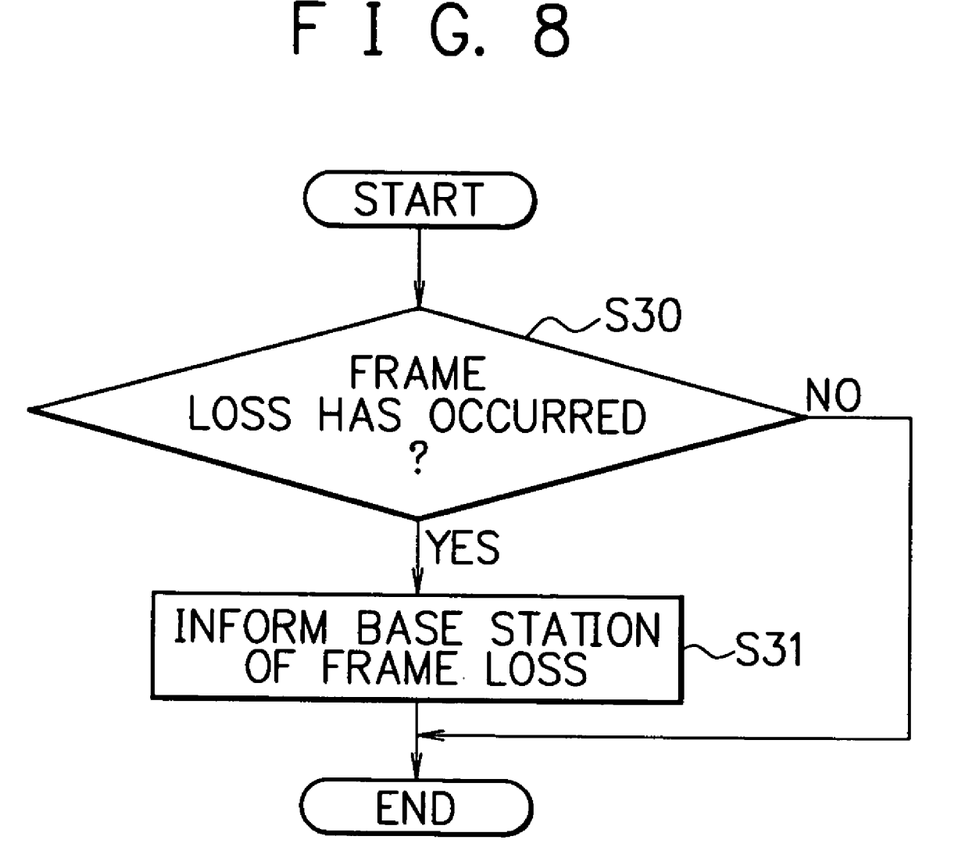
FIG. 8 is a flowchart illustrating the operation of the mobile radio equipment for judging whether or not a frame loss has occurred in decoded data.

FIG. 8 is a flowchart illustrating the operation of the mobile radio equipment for judging whether or not the frame loss has occurred in decoded data. In the following, a description will be made of the operation of the mobile radio equipment for judging whether or not the frame loss has occurred in decoded data according to a known method.

The monitor-judge section 24 judges whether or not the frame loss has occurred in decoded data (step S30). When the frame loss has occurred in the decoded data (step S30, YES), the monitor-judge section 24 informs a base station of the fact that the frame loss has occurred (step S31). When the frame loss has not occurred (step S30, NO), the monitor-judge section 24 repeats the process of determining whether or not the frame loss has occurred in decoded data (operation is repeated from step S30).

As set forth hereinabove, in accordance with the present invention, when the rate of transmission is beyond the decoding capability of the decoder of the mobile radio equipment and data cannot be output to a user normally, a base station is instructed to reduce the transmission rate. Thus, unnecessary use of resources is avoided, and, therefore, the resources of the radio base station are most effectively used.

Moreover, if the performance of the mobile radio equipment changes according to a change in the application function CPU, the rate of transmission between the mobile radio equipment and a base station can be kept at its optimum value. Additionally, since the transmission system function CPU does not need to be adjusted, the versatility of the transmission system function CPU can be expanded.

Furthermore, the decoding condition of the decoder is immediately reported from the application function CPU to the transmission system function CPU, which improves the performance of the mobile radio equipment.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. Mobile radio equipment, comprising:
   a radio transmitter/receiver for transmitting/receiving radio data;
   a transmission unit for converting the received data received by the radio transmitter/receiver;
   an application unit for executing applications;
   a decoder for decoding the data output from the transmission unit;
   a memory for storing the decoded data output from the decoder;
   an input/output section for inputting/outputting the decoded data output from the decoder;

a load data output section for outputting the decoded data output from the decoder as load data;

a load data input section for inputting the decoded data output from the decoder as load data;

a judge section for judging the load data on a preset threshold value; and a transmission controller for controlling a transmission rate based on a judgment made by the judge section, wherein the judge section is provided with two threshold values, one for judging whether the load data is beyond a decoding capability of the decoder, and the other for judging whether the load data is beneath the decoding capability, wherein the judge section includes a comparator for comparing the load data input from the decoder with the threshold values in order to judge whether an amount of the data is within a capacity of the mobile radio equipment to process, wherein the transmission controller requests a base station to reduce the data transmission rate when the load data exceeds one of the threshold values, and wherein the transmission controller requests the base station to increase the data transmission rate when the load data is below the other threshold value.

2. Mobile radio equipment, comprising:

a radio transmitter/receiver for transmitting/receiving radio data;

a transmission unit for converting the received data received by the radio transmitter/receiver;

an application unit for executing applications;

a decoder for decoding the data output from the transmission unit;

a memory for storing the decoded data output from the decoder;

an input/output section for inputting/outputting the decoded data output from the decoder;

a load data output section for outputting the decoded data output from the decoder as load data;

a load data input section for inputting the decoded data output from the decoder as load data;

a judge section for judging the load data on a preset threshold value and for judging whether a frame loss has occurred in the decoded data; and a transmission controller for controlling transmission rate based on a judgment made by the judge section.

3. The mobile radio equipment claimed in claim 2, wherein the judge section includes a comparator for comparing the load data with a threshold value in order to judge whether an amount of the data is within a capacity of the mobile radio equipment to process.

4. The mobile radio equipment claimed in claim 2, wherein the judge section includes a comparator for comparing the load data with a threshold value in order to judge whether an amount of the data is within a capacity of the mobile radio equipment to process.

5. The mobile radio equipment claimed in claim 2, wherein:

the judge section includes a comparator for comparing the load data input from the decoder with a threshold value in order to judge whether an amount of the data is within a capacity of the mobile radio equipment to process;

the transmission controller requests a base station to reduce the data transmission rate when the load data exceeds the threshold value; and the transmission controller requests the base station to increase the data transmission rate when the load data is below the threshold value.

6. The mobile radio equipment claimed in claim 2, wherein:

the judge section is provided with two threshold values, one for judging whether the load data is beyond a decoding capability of the decoder, and the other for judging whether the load data is beneath the decoding capability;

the judge section includes a comparator for comparing the load data input from the decoder with the threshold values in order to judge whether the amount of the data is within a capacity of the mobile radio equipment to process;

the transmission controller requests a base station to reduce the data transmission rate when the load data exceeds one of the threshold value; and the transmission controller requests the base station to increase the data transmission rate when the load data is below the other threshold value.

* * * * *